March 28, 1961 R. BOUFFILH ET AL 2,976,785

ITALIC-FORMING ANAMORPHOTIC DEVICE FOR USE IN PHOTO-COMPOSITION

Filed Sept. 18, 1956 3 Sheets-Sheet 2

March 28, 1961 R. BOUFFILH ET AL 2,976,785

ITALIC-FORMING ANAMORPHOTIC DEVICE FOR USE IN PHOTO-COMPOSITION

Filed Sept. 18, 1956 3 Sheets-Sheet 3

United States Patent Office 2,976,785

Patented Mar. 28, 1961

1

2,976,785

ITALIC-FORMING ANAMORPHOTIC DEVICE FOR USE IN PHOTO-COMPOSITION

Raymond Bouffilh and Charles Savigny, Paris, France, assignors to Société Anonyme dite: Ateliers Bariquand & Marre, Arcueil (Seine), France

Filed Sept. 18, 1956, Ser. No. 610,448

Claims priority, application France Sept. 23, 1955

1 Claim. (Cl. 95—4.5)

The present invention relates to improvements in optical anamorphotic systems for use in the photo-composition of texts, and more particularly to anamorphotic devices adapted to impart an inclination to the vertical members of characters of a given style, whether typographic, typewritten or else, in order to obtain the so-called italics style of type.

To be advantageous, the distortion effect should not entail any modification in the type alignment and orientation, and to the over-all dimensions of the original type. This distortion effect should desirably be applicable at will to a single letter or sign, to a word, to one fraction of a line or to a complete line, to incorporate either anamorphosized elements in a line consisting of non-anamorphosized elements, or a homogeneous anamorphosized line in a page consisting of non-anamorphosized lines.

To carry out this anamorphosis, it is possible to use devices already known in the motion-picture technique which provide the desired anamohphosis and consists of a combination of astigmatic lenses having cylindrical surfaces designed to provide the optical stigmatism (that is, a definitely sharp image) irrespective of the opening conditions, whereas in hitherto used systems comprising but a single cylindrical lens the opening must necessarily be very small to provide the required stigmatism.

Devices of this general character are so designed that the dimensions of the sighted object are altered only in a preselected direction. Thus, the italic style of type may be obtained by providing a maximum distortion effect in the verticals and zero distortion effect in the horizontals. In order to maintain the anamorphosized characters or figures within their initial over-all dimensions, an optical magnification-correcting device must be associated with the anamorphotic system to ensure the homothetic transformation of the anamorphosized characters or figures.

Now, it is the essential object of this invention to provide improved means whereby the aforesaid magnification-correcting device may be dispensed with. It consists broadly of a combination of at least two cylindrical lenses each having two cylindrical surfaces, the one concave and the other convex, with their generatrices disposed at right angles to each other.

According to a specific embodiment of this invention, these means comprise two lenses of the aforesaid type which have their planes of symmetry at right angles to each other. This optical system is effective in two directions at right angles to each other, instead of in a single direction. It is so designed that the over-all dimensions of the characters remain unchanged before and after the anamorphosis, without requiring any correcting devices. It may be associated at will with either a conventional-type lens to magnify the image in all directions within the desired ratio, or to a justification device, or to any other suitable anamorphotic device.

A prism is associated with the device to rotate the anamorphosized image and replace the horizontals of

2 the anamorphosized characters in alignment with those of the non-distorted characters.

Mechanical means are provided for either retracting the anamorphotic and rectifying devices or cancelling the effects thereof, so that it is possible to compose lines by photographically reproducing letters or signs, words or line fractions converted at will into italics; besides, it is possible to compose pages by photographically reproducing homogeneous lines, with or without anamorphosis.

According to another feature of this invention, the device broadly set forth hereinabove is adapted to ensure a double anamorphotic effect in two opposite directions by simply rotating the principal axis; in photo-composition this effect produces the following distortions in characters not subjected to strict dimensional limitations, such as titles, sub-titles or the like: either an elongation combined with a narrowing, or a lowering combined with a widening.

In order to afford a better understanding of the present invention and of the manner in which the same may be carried out in the practice, reference will now be made to the accompanying drawings forming part of this specification and illustrating diagrammatically by way of example a few embodiments thereof. In the drawings.

Figure 1:
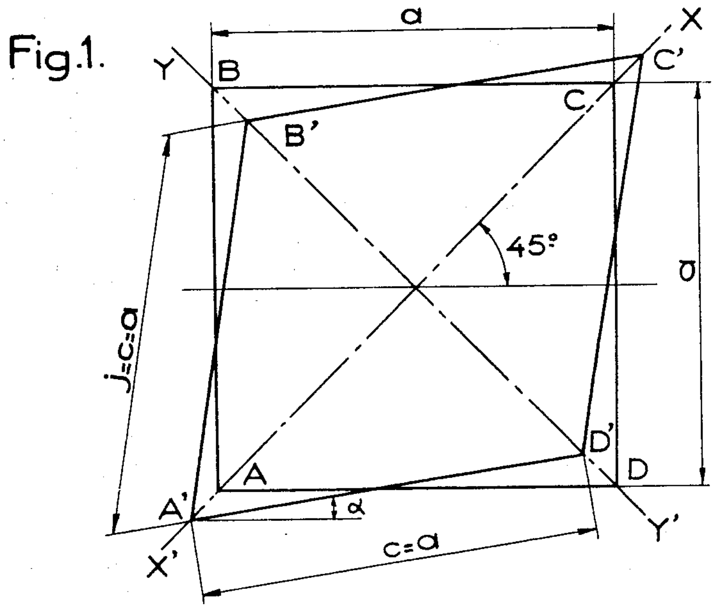
Figure 1 shows the distortion to which the image A'B'C'D' of a square-shaped character ABCD has been subjected through an anamorphotic device constructed in accordance with the teachings of this invention, and wherein the overrun and the length of the vertical components of this character are equal to those of the initial character.

In Fig. 1 of the drawings, the square ABCD has a side length $a$ and represents the original character or figure of which the photographic reproduction is subjected to the anamorphosis; the square shape was chosen to facilitate the understanding of the disclosure; of course, a rectangle representing under the same conditions a word, a line fraction or a complete line would lead to the same conclusions.

The optical device is so designed as to provide in one meridian a magnification greater than 1 and in the meridian at right angles thereto, a magnification lower than 1; in the case illustrated in Fig. 1, X'X indicates the meridian of magnification greater than 1 and Y'Y the meridian of magnification lower than 1. By so directing the device as to cause the meridians X'X and Y'Y to merge in the diagonals of the square, the latter is converter into a lozenge A'B'C'D'. By adequately selecting the values of these two magnifications the lozenge sides will be of same length as the square sides; in other words, in the case of photo-composition, A'D' represents the over-run $c$, and A'B' the length of "down-strokes" $j$, with the equality $a=c=j$.

In the embodiment of this invention the values of the magnifications are 1.145 along the meridian X'X and 0.830 along the meridian Y'Y. The anamorphotic assembly is set at 45° with respect to the horizontal and the slope of the italic character obtained in this specific case represents 18° as measured from a line at right angles to the type line, this angle being the conventional slope of italics.

In practice, the difference in body height which arises from the fact that the vertical elements of the letter or character is kept unaltered is completely negligible. However, if it is desired to maintain the body height to a strictly unchanged value in both figures, that is in the straight or upright characters and in the italic characters, an alternate embodiment of this invention is provided which, as will be explained hereafter, maintains at the same time the equality in length of the over-run.

Figure 2:
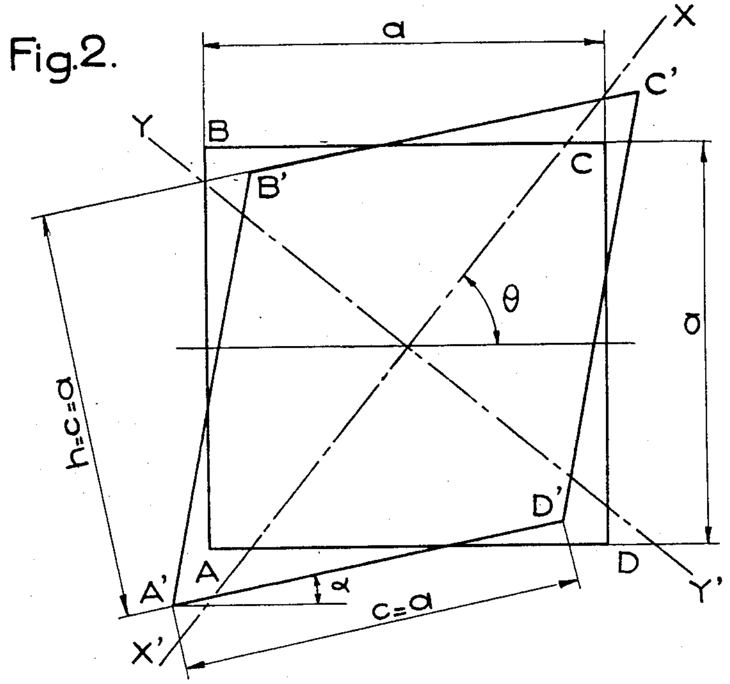
Figure 2 illustrates a distortion such that the over-run and the body of the image remain equal to those of the original character.

In Fig. 2, the square ABCD having a side length $a$ represents the figure of the character of which the photographic reproduction is subjected to the anamorphosis. A rectangle representing under the same conditions a word, a fraction of a line or a complete line, would lead to the same conclusions. By suitably selecting the general direction of the anamorphotic system and of the two magnifications, the square ABCD is converted into a parallelogram A'B'C'D' of which the height $h$ is equal to the body height AB whilst the base A'D' is equal to AD representing the over-run.

In the practical embodiment of this invention the angle $\theta$ is about 51° and the magnifications are respectively 1.235 along the meridian X'X and 0.815 along the meridian Y'Y at right angles to the former. The slope of the verticals, as resulting from this specific embodiment, is 22° which corresponds to the usual angle of italics.

In the two embodiments considered hereinabove the sharpness of the image results from the coincidence between the planes of the images given by the "oblique" anamorphotic device in both meridians; it is advantageous that these planes coincide with the object plane (which in turn may be an image given by a photographic lens, according as the anamorphotic device is interposed before or after the lens), so that the passage from the roman style of type to the italic or sloping style of type through interposition of the "oblique" anamorphotic device (if desired of the collapsible or retractable type) will not alter the focusing since the distance between the document and the emulsion remains unchanged.

Figure 3:
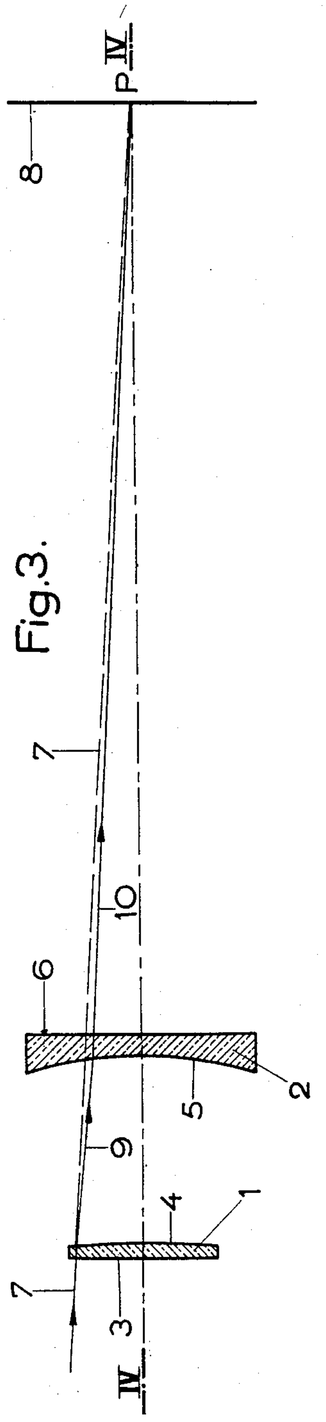
Figure 3 is a diagrammatic section showing an anamorphotic device according to this invention, the section being taken upon the line III—III of Fig. 4.
Figure 4:
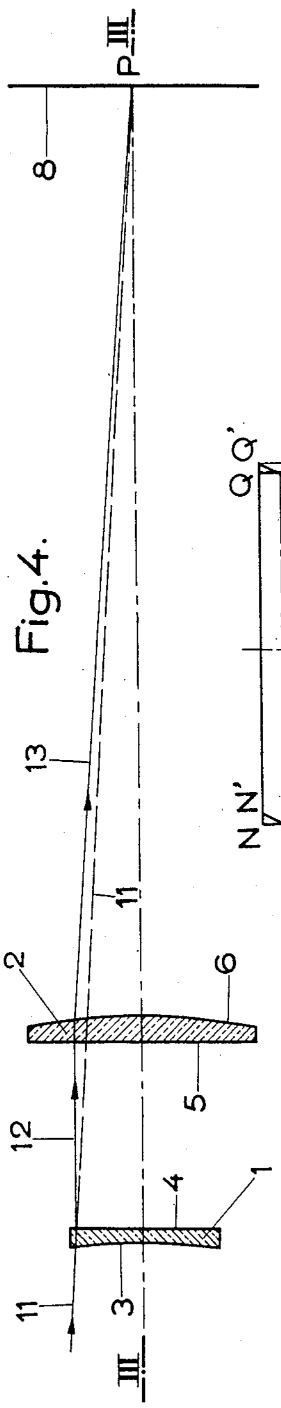
Figure 4 is a similar section taken upon the line IV—IV of Fig. 3.

Figs. 3 and 4 illustrate a typical embodiment of the anamorphotic device operating in accordance with the general requirements set forth hereinabove. Fig. 3 shows the longitudinal section of the device along the meridian X'X and Fig. 4 a corresponding section along the meridian Y'Y. In both figures the reference numeral 1 designates the first optical element having a convergent effect in Fig. 3 and a divergent effect in Fig. 4, the surface 3 being a concave cylindrical surface and the surface 4 a convex cylindrical surface, the generatrices of these surfaces being directed at right angles to one another. In these figures, 2 is the second optical element having a divergent effect in Fig. 3 and a convergent effect in Fig. 4, the surface 5 being a concave cylindrical surface and the surface 6 a convex cylindrical surface, the generatrices of these surfaces 5, 6 being disposed at right angles to one another. Although single elements 1 and 2 are shown in this diagram for the sake of clarity, it is evident that more complicated assemblies may be used as required in connection with the technique usually applied to the correction of aberrations.

These diagrams show the path of a light ray in both meridians to illustrate the sharpness requirements set forth hereinabove. The emulsion 8 intersects the optical axis at P. The light ray 7 passing normally through this point P when the anamorphotic system is retracted is deflected firstly by the lens 1 in a direction 9 when the anamorphotic system is interposed and secondly by the second lens 2 in the direction 10 to meet the emulsion at P.

The light ray 11 passing normally through the point P when the device is retracted is deflected firstly through the lens 1 in the direction 12 and then through the lens 2 in the direction 13 to meet the emulsion at P, when the device is restored to its operative position.

In Figs. 1 and 2 it is apparent that the whole of the anamorphosized object is sloped. A solution has already been proposed to this problem, which consists in rotating through the desired angle either the document or the sensitive emulsion. This simple solution may however constitute a source of difficulties due to the other conditions of operation.

A specific feature of the present invention is the addition of a rectifying device which may form an integral part of the anamorphotic device and be collapsible therewith.

According to an advantageous alternate embodiment, the effect of the reflecting rectifying device is synchronized with the introduction of the anamorphotic device.

Figure 6:
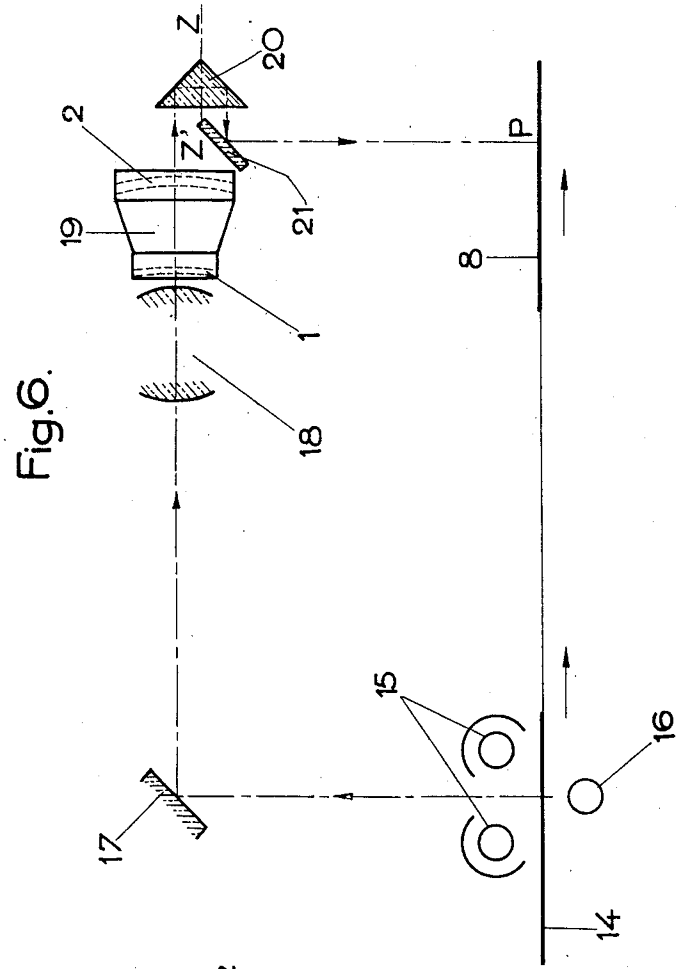
Figure 6 is a diagrammatic view showing a reproduction chamber comprising an anamorphotic device for producing italic characters, which is called "oblique" anamorphotic device, associated with a rectifying prism for restoring the alignment of the horizontals of the anamorphosized characters.

Figure 6 is a diagram showing a typical embodiment of a reproduction chamber wherein 14 is the original document, 15 the light source for opaque documents, 16 the light source for transparent documents, and 17 an optical mirror; the reference numeral 18 designates diagrammatically the assembly of an optical reproduction device with, if desired, a justification anamorphotic device; 19 is the "oblique" anamorphotic device enclosing essentially the cylindrical lenses 1 and 2, 20 is the rectifying prisms, 21 the mirror, and 8 the sensitive emulsion; the image-point P lies on the optical axis.

Figure 7:
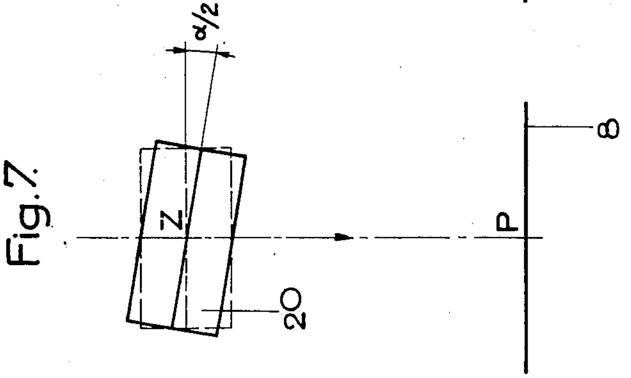
Figure 7 is an end view of the rectifying system.

The rectifying device according to this alternate embodiment consists of a total-reflection prism 20 adapted to pivot about an axis Z'Z through an angle equal to one-half of the correction to be made $\alpha/2$. Stops are provided for suitably defining the end positions of the prism. Fig. 7 illustrates an end view of the rectifying system and shows the two positions in which the prism 20 may be placed, according as the "oblique" anamorphotic system is interposed or retracted.

Figure 5:
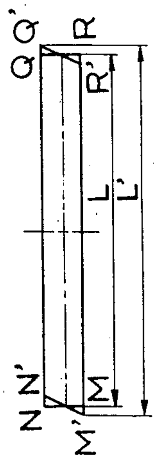
Figure 5 shows the over-all dimensions of a line of characters MNQR before the anamorphosis and M'N'Q'R' after the anamorphosis.

Fig. 5 shows the over-all dimensions of a line in its two successive conditions, that is, MNQR before the anamorphosis and M'N'Q'R' after the anamorphosis. The length measured along the axis (or "justification") remains unchanged according to the above-described characteristics; however, the over-all dimension L' is greater than L. In the practice, when the anamorphosized object consists of a word or the fraction of a line incorporated in the body of a line, the difference $L'-L$ is absorbed by the space separating said elements from the closely adjacent elements. In fact, this difference $L'-L$ is appreciable only in the vertical justification alignments (beginning and end of lines). The correction of this drawback does not bring any modification in the principle of the optical anamorphotic system described herein which, by modifying only very moderately the theoretical magnifications, could ensure the keeping of the justification at the expenses of a strict over-run. For all practical purposes, the embodiment has demonstrated that the difference $L'-L$ is corrected by simply adjusting the device; thus, a very slight variation in the direction of the anamorphotic device is sufficient to provide a convenient justification.

The embodiment just described is given only for illustrative purposes and should not be construed as limiting the scope of the invention since many modifications may be brought thereto without departing from the spirit and principles of the invention; thus, more particularly, the number of cylindrical lenses may be greater than two and any lenses as may be required for correcting aberrations may be added thereto in the known manner. The lens characteristics are selected as a function of the desired anamorphosis characteristics. The relative cutting and spacing of the lenses in the device are dictated by optical requirements in order to ensure the desirable sharpness of the image.

What we claim is:

An optical anamorphotic device for use in photocomposition, which is adatped to transform roman-style characters into italic-style characters without altering either the line length or the heights of these characters, said device comprising at least two cross-cylindrical lenses each provided with two cylindrical surfaces, the one concave and the other convex, having their generatrices disposed at right angles, said two cross-cylindrical lenses being disposed one after another so that the generatrices of the concave surface of the first cross-cylindrical lens are parallel to the generatrices of the convex surface of the other cross-cylindrical lens and, conversely, that the generatrices of the convex surface of the first cross-cylindrical lens are parallel to the generatrices of the concave surface of the other cross-cylindrical lens, the generatrices of the cross-cylindrical lens assembly being set at an angle approximating 45 degrees with respect to the direction of the line to be anamorphosized, said lenses being adapted to provide a magnification greater than 1 in one direction and inferior to 1 in a direction at right angles to said one direction and the optical characteristics of said lenses being such that the images of the vertical lines and those of the horizontal lines are formed on a same plane which is at the same time the plane in which the non-anamorphosized images are formed when the anamorphotic device is retracted from the photographic field, and a prism adapted to cause a rotation of the anamorphosized image in order to re-align the horizontals of the anamorphosized characters with those of the non-modified characters.

References Cited in the file of this patent

UNITED STATES PATENTS

| | | |
|---|---|---|
| 1,292,901 | Smith | Jan. 28, 1919 |
| 1,321,906 | Gehrmann | Nov. 18, 1919 |
| 2,314,272 | Grudin | Mar. 16, 1943 |
| 2,428,399 | Timoney | Oct. 7, 1947 |

FOREIGN PATENTS

| | | |
|---|---|---|
| 8,512 | Great Britain | Apr. 12, 1898 |
| 706,690 | Great Britain | Apr. 7, 1954 |